Jan. 10, 1956     D. J. McLAUGHLIN     2,730,596
MOTOR DRIVEN RHEOSTAT
Filed March 7, 1955     3 Sheets-Sheet 1
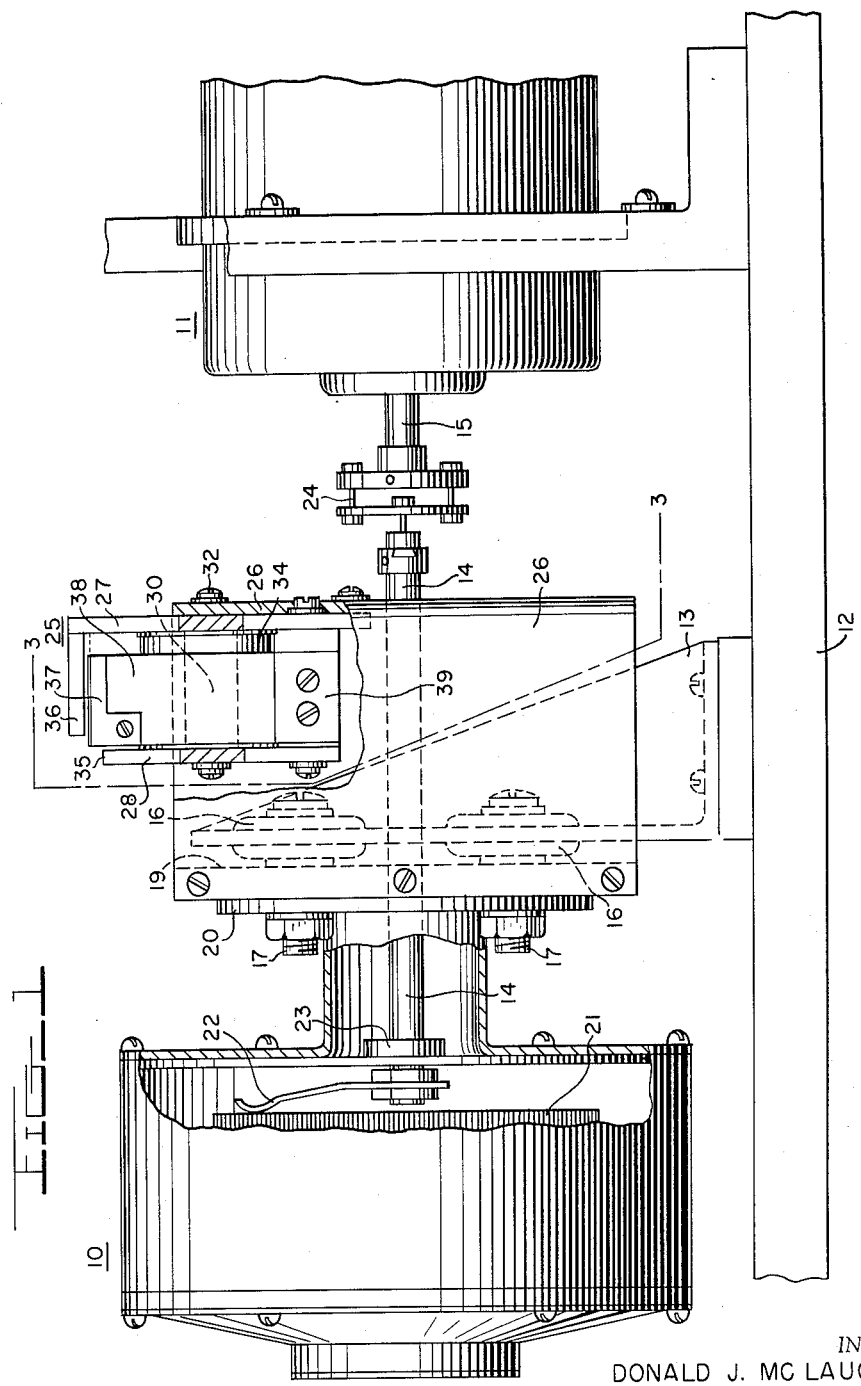
INVENTOR
DONALD J. MC LAUGHLIN
BY *Wilson G. Maltby*
*Howard White* ATTORNEYS

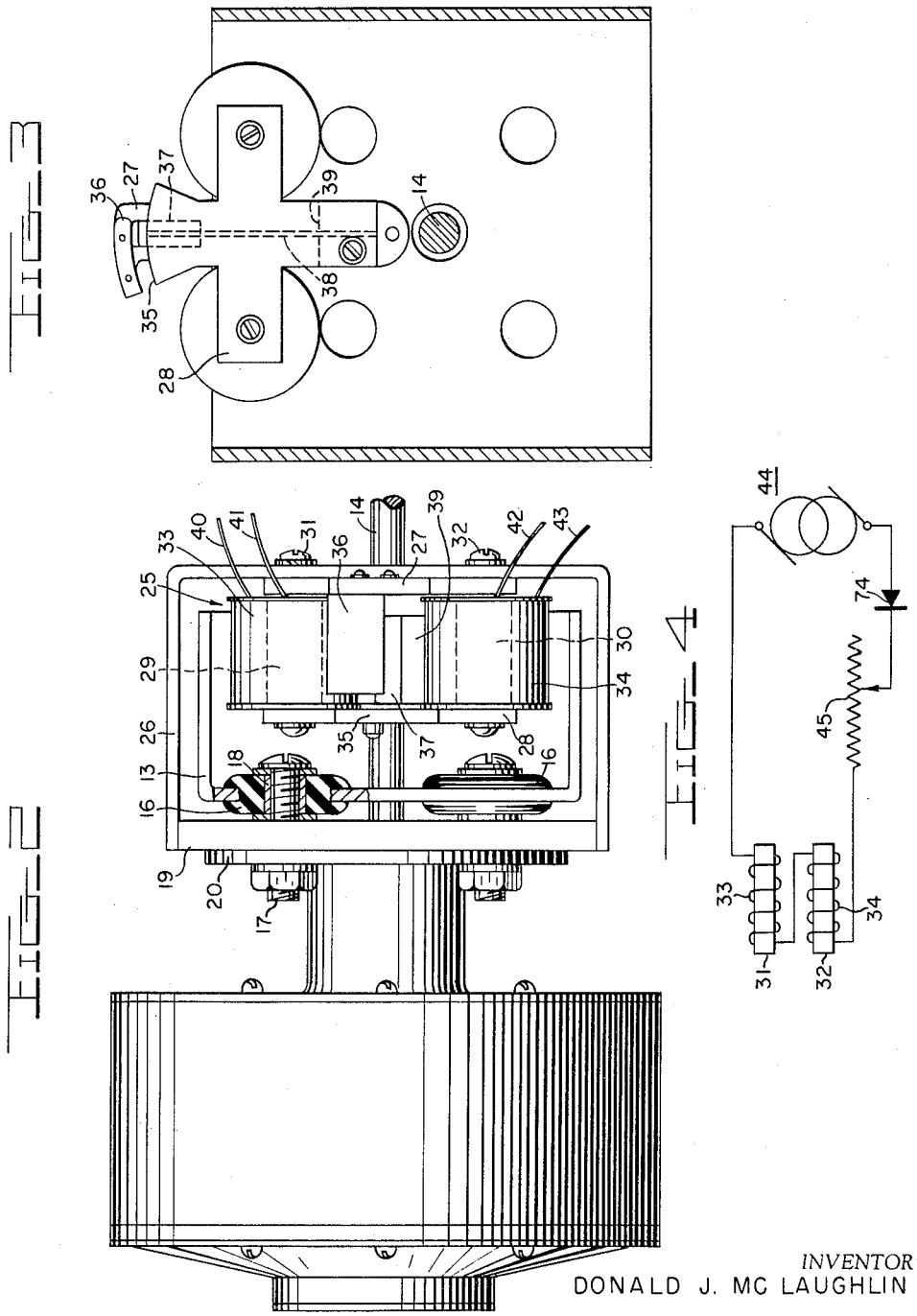

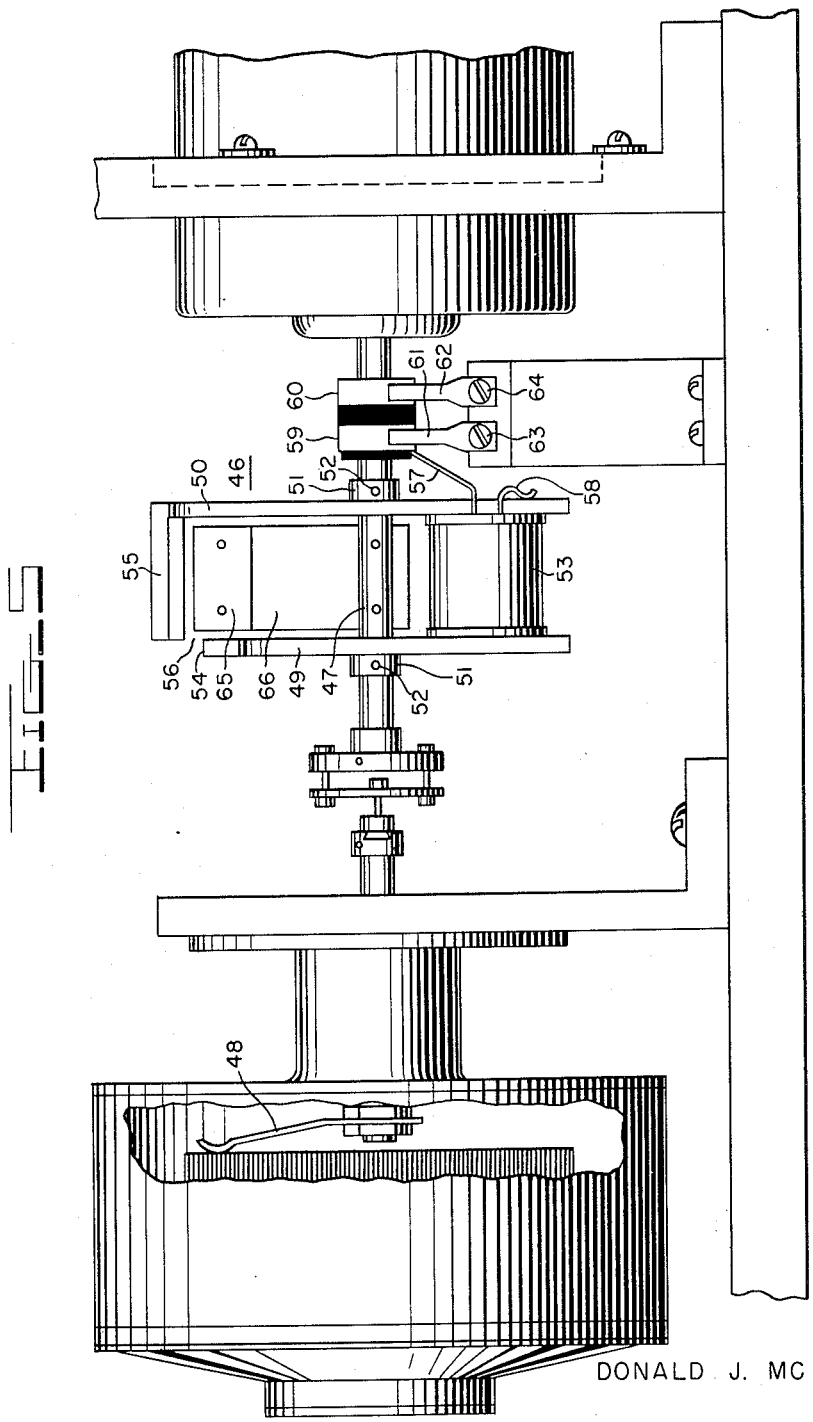

United States Patent Office 2,730,596
Patented Jan. 10, 1956

2,730,596
MOTOR DRIVEN RHEOSTAT

Donald J. McLaughlin, Washington, D. C., assignor to the United States of America as represented by the Secretary of the Navy Application March 7, 1955, Serial No. 492,815

8 Claims. (Cl. 201—48)

(Granted under Title 35, U. S. Code (1952), sec. 266)

The invention described herein may be manufactured and used by or for the Government of the United States of America for governmental purposes without the payment of any royalties thereon or therefor.

The present invention relates in general to remote control or servo systems such as use a synchro motor driven by a synchro generator. Ordinarily a system of this type will lose accuracy as the load on the motor shaft is increased. The conventional method would be to use a servo drive-motor, gear trains, position and rate feedback device and servo amplifier requiring power supply, vacuum tubes, special transformers and critical controls to adjust feedback damping and gain. However, where the load is mainly a friction load such as potentiometer or rheostat coupled to the motor, most of the above accessories are unnecessary and loss in accuracy may be reduced by reducing the load caused by the friction of the wiper arm of the potentiometer or rheostat.

An object of the present invention is to provide means for substantially neutralizing the frictional load between motor driven relatively rotatable frictional engaging members, independently of the energy supplied by the motor.

Another object is the provision of means for applying mechanically to one of a pair of relatively rotational members a torsional vibration centered approximately about the axis of relative rotation.

A further object is the provision of means of the above type capable of application to existing forms of synchro motors and potentiometers or rheostats without substantial modification of such existing forms and without change in their manner of operation.

Various other objects and advantages of the invention will become apparent from a perusal of the following specification and the drawings accompanying the same.

In the drawings:

Fig. 1 is a side view showing the invention applied to a coupling between a synchro motor and a potentiometer.

Fig. 2 is a top plan view of the assembly of Fig. 1 with the motor and part of the potentiometer omitted.

Fig. 3 is a section on the line 3—3 of Fig. 1.

Fig. 4 is a diagram of a control circuit for the vibrator magnet.

Fig. 5 is a side view of a modification for use directly on the motor shaft.

Referring to the drawings in detail, and first to Fig. 1, here the invention is shown as embodied in a synchro system comprising a frictional load element in the form of a potentiometer 10 driven by a synchro motor 11 which may be of any standard design. The synchro motor is fixedly mounted on a base element 12 while the body portion of the potentiometer is flexibly mounted on a stationary support 13 fixedly mounted on the common base 12, the arrangement being such as to mount the potentiometer with its drive shaft 14 in axial alignment with the motor shaft 15. This mounting is accomplished through the use of the four doughnut shaped mounting grommets 16 of strong flexible material such as soft rubber connecting the potentiometer to the stationary support 13 at points arranged symmetrically around the common axis of the shafts 14 and 15. One such grommet mounting is shown in axial section in Fig. 2. Connection is made with the potentiometer by mounting bolts 17 clamping together the inner core elements 18, mounting plate 19 and potentiometer flanged coupler 20, as fixed parts of the potentiometer. The grommets 16 are secured near their peripheries to the stationary support 13 by engagement with the rims of suitably proportioned openings in the support. Thus the body portion of the potentiometer, which constitutes the support for the usual arcuate resistance strip 21, swept over by the contact wiper arm 22 carried by the shaft 14, is resiliently mounted in a manner to permit torsional vibration about the common axis of shafts 14—15. While the resistance strip 21 is here indicated as the usual arcuate strip of closely spaced convolutions of resistance wire wound about an arcuate core of insulating material, it will be understood that the resistance element may be of any known or other suitable type spaced and positioned to be swept over by a contact element such as the wiper arm 22 in rubbing contact with the resistance strip. The potentiometer shaft 14 mounted in a bearing 23 carried by the potentiometer housing, is coupled to the motor shaft 15 through a suitable universal joint element 24.

To effect torsional vibration of the potentiometer about the axis of its driving shaft and consequently in the direction of relative motion between the potentiometer resistance element and the contact wiper, a vibrator assembly 25 is fixedly mounted relative to the potentiometer through a vibrator bracket 26, mounting plate 19 and coupling flange 20 carried by the potentiometer housing in fixed relation to the latter.

The vibrator assembly comprises a pair of cross shaped pole pieces 27 and 28 each connected at the ends of its horizontal extensions to like poles of a pair of electromagnet core elements 29 and 30 secured rigidly by cap screws 31—32 to the vibrator bracket 26 of nonmagnetic material such as aluminum alloy. Suitable energizing windings 33—34 are provided for the cores 29—30 respectively for energization by suitable pulsating current source which latter may be the conventional 110 volt 60 cycle source, rectified. The vertical arms of the pole pieces extend above the magnets where the front pole piece 27 is extended rearwardly (toward the viewer in Fig. 3) to near the top end 35 of the rear pole piece through a pole piece shoe 36. The spaced opposed surfaces of the top end 35 of the rear pole piece and the pole shoe 36 of the front pole piece are arcuate in shape to provide an arcuate gap in the magnetic circuit. Mounted to oscillate into and out of bridging relation with said gap is an armature 37 of magnetic material in the form of a vibrating weight element. This vibrating weight element 37 is resiliently mounted through a leaf spring 38 on an anchor post 39 of nonmagnetic material fixedly mounted across the lower extensions of the pole pieces 27—28. The top surface of the weight element 37 is arcuate and it and the arcuate surfaces of the pole piece shoe 36 and top end 35 of pole piece 28 are concentric with the center of oscillation of the leaf spring 38 about an axis extending approximately along its line of connection with the anchor post 39. This arrangement brings the axis of oscillation of the weight element 37 and spring 38 between the weight and the axis of the potentiometer shaft and in parallelism with the latter, so that the weight element is constrained to oscillate approximately about the axis of relative circular movement between the potentiometer resistance element 21 and the contact wiper arm 22. For proper energization of the vibrator driving magnets for oscillating the vibrator at desirable frequency and amplitude, the magnet winding leads 40, 41, 42 and 43 lead from a control circuit which may be of any known or other suitable design capable of supplying an alternating or periodically variable current of suitable frequency and at adjustable amplitude or intensity. Such a control circuit preferably may be that diagrammed in Fig. 4. Here the driving magnet windings 33—34 are in series with a conventional 110 volt A. C. source 44, rectifier 74 and a suitable control rheostat 45. Thus with pulsating current fed through the magnet windings the magnet cores are alternately magnetized and demagnetized, causing the weight element or armature 37 of magnetic material to be alternately attracted from its normal central position into and released from the center of the leakage flux path between the magnetic polar terminals 35 and 36.

In operation the rheostat 45 is adjusted to effect oscillation of the weighted armature 37 at an amplitude sufficient to apply a torque of an amplitude equal to or just below that required to overcome standing or static friction. Because the load, neglecting inertia, is mainly a friction load, very little opposing force is encountered by the motor other than that offered by inertia. This makes for the attainment of a high degree of accuracy for the synchro motor in positioning the contact wiper arm in response to remote control of the synchro motor without necessity for position and rate feedback devices, servo amplifier and mechanical drive system.

Referring now to Fig. 5, here is shown a modification in which the vibrator element, indicated as a whole by reference numeral 46, is carried by an extension 47 of the potentiometer shaft and fixedly secured thereto whereby it is fixed relative to the contact wiper arm 48 of the potentiometer. In this modification the magnet pole pieces 49 and 50 pierced centrally by the shaft extension 47 of nonmagnetic material are held fixed on the shaft in any known or other suitable manner as by a collar 51 fixed to the pole piece bar and secured to the shaft by a set screw 52. The pole piece bars 49—50 are spaced apart axial of the shaft and connected at one pair of adjacent ends by an energizing electromagnet 53. At the other pair of adjacent ends, the pole piece 49 is spatulated to present a widened arcuate magnetic polar terminal 54 similar in shape to the pole face 35 of Fig. 3, while the pole piece 50 is similarly shaped and provided with an arcuate extension 55 positioned radially beyond and extended toward the polar terminal 54 leaving an air gap 56. Lead wires 57—58 for the electromagnet 53 connect with suitable slip rings 59—60 from which circuit connections are extended through suitable brushes 61—62 to stationary binding posts 63—64, wire 57 connecting with insulated slip ring 59 while wire 58 is grounded thus connecting with grounded slip ring 60. Mounted to oscillate into and out of the space just under the arcuate extension 55 near the polar terminal 54, is a weighted armature element 65 of magnetic material secured to the shaft extension 47 through a flat spring arm 66 extending radially from the shaft to the weighted armature and biased to normally hold the armature element slightly to one side of the terminal ends of the pole piece bars 49—50, or slightly out of the center of maximum magnetic field strength in the above mentioned space so as to be drawn into said space upon energization of the electromagnet 53.

Thus upon energization of the magnet 53 from a suitable source of alternating current, which may be a conventional sixty cycle 110 volt power supply, unrectified or rectified, the weighted armature 57 is thrown into oscillation at a frequency equal to the frequency of the pulses of energizing current and an amplitude governed by the strength of such current. Regulation of current strength may be achieved in the same manner as that described in connection with the modification of Figs. 1 to 4. It will be understood that in place of sinusoidal alternating current, suitable energization of the vibrator element may be effected by any form of periodic variable current. The vibrator element 46 as a whole is positioned in balance on the shaft extension 47 so as to preserve proper balance of the motor armature and shaft, and the various elements carried thereby. It will also be understood that the vibrator may be arranged to act as a self interrupter of its energizing circuit in any known or other suitable manner, enabling the use of a direct current source.

In both modifications of the invention here shown the vibrating weight element and its spring support are tuned to the frequency of the variable energizing current, that is, the natural frequency of the weight and spring couple, and the frequency of energizing current pulses, should be the same.

The invention has been found to be adequately effective under conditions which do not require more or less constant rotation of the driven element at moderately high speeds. A speed in the order of 15 R. P. M. is considered a moderately high speed. It is most useful where the rotating element is rotating slowly or has been momentarily stopped to observe a static position accurately.

In such synchro drives there is always required, upon stoppage, some short interval of time for the driven element, in the present example the wiper arm of a potentiometer, to settle to a position corresponding to that of a controlling synchro generator. In the modification here disclosed a settling time of about one second has been observed with the vibrator driven from a rectified 60 cycle alternating current source as described.

What is claimed is:

1. An antifriction variable resistance device comprising a base frame, a variable resistance element having an arcuate resistance strip mounted on said frame with a contact arm rotatably mounted on said frame to sweep over said resistance strip, said resistance strip being resiliently mounted on the frame for vibration about substantially the center of sweep of said contact arm, a vibratory weight resiliently connected with said resistance strip, means for vibrating said weight in substantially the direction of movement of said contact arm, and means for varying the amplitude of vibration of said weight, whereby oscillatory force transmitted through said resilient connection to the resistance strip may be varied to an amount just below that required to overcome the static friction between the resistance strip and the contact arm.

2. An antifriction variable resistance device comprising a base frame, an arcuate resistance strip mounted on said frame, a contact arm rotatably mounted on the frame to sweep along said arcuate strip about substantially the center of the arc of the strip, said resistance strip being resiliently mounted on the frame independently of the contact arm, a vibratory weight element resiliently connected with the resistance strip, means for vibrating said weight in substantially the direction of movement of said contact arm, and means for varying the amplitude of vibration of the weight.

3. An antifriction variable resistance device comprising a base frame, a resistance strip support mounted on said frame, a resistance strip fixed on said support, a contact element movably mounted on the frame for movement along said resistance strip, means for driving said contact element, said resistance support being resiliently mounted on the frame to permit vibration of the support in the direction of relative movement between the contact element and the resistance strip independently of said driving means, a vibrator weight resiliently connected with said support, means for vibrating said weight in substantially the direction of movement of said contact element and means limiting the amplitude of vibration of the weight to an amount just insufficient to overcome static friction between the contact element and the resistance strip.

4. An antifriction sliding contact resistance device comprising a resistance element and a contact element mounted for relative movement in rubbing contact, a vibratory weight element, resilient means mechanically connecting said weight element with one of said relatively movable elements and constraining the weight elements to vibrate in the general direction of relative movement between said relatively movable elements, means for vibrating said weight element to impart an oscillatory force to said one of said relatively movable elements in the general direction of the relative movement, and means for varying the amplitude of vibration of the weight whereby the amount of oscillatory force may be regulated to an amount just sufficient to overcome static friction between said relatively movable elements.

5. A remote, potentiometer control system comprising a base frame, a selsyn motor mounted on the frame, a rotary type potentiometer having an arcuate resistance strip and support therefor mounted on the frame, a contact arm carried by the motor shaft to sweep over the resistance strip, said resistance strip support being resiliently mounted on the frame independently of the arm and motor to permit torsional vibration about the axis of rotation of the motor shaft and arm, a weight element resiliently connected with said support and constrained to vibrate substantially about said axis, means for applying energy to said weight to vibrate the same, and means limiting the amount of energy to just insufficient to overcome static friction between the resistance strip and the contact arm.

6. An antifriction sliding contact resistance device comprising a pair of engaging elements one a resistance element and the other a contact element, said elements mounted in rubbing contact, a vibrator element fixed to one of said engaging elements having a vibrating weight constrained to vibrate in the general direction of relative movement between said engaging elements, means for vibrating said weight, and means for varying the amplitude of vibration of the weight whereby the amount of oscillatory force available for coupling to said one of said engaging elements may be regulated to an amount just short of that necessary to overcome static friction between said engaging elements.

7. A sliding contact variable resistance device comprising a supporting element, an arcuate resistance element, a contact element mounted to sweep in an arc over said resistance element in rubbing contact therewith, said resistance element being resiliently mounted on the support to permit torsional vibration substantially about the axis of sweep of said contact element, a vibrator element mounted in fixed relation to the resistance element, said vibrator element having a vibrating weight constrained to vibrate substantially about the axis of sweep of the contact element, means for vibrating said weight, and means for varying the amplitude of vibration of said weight whereby the amount of oscillatory force available for coupling to said resistance element may be regulated to an amount just short of that necessary to overcome static friction between said resistance element and said contact element.

8. A motor driven variable resistance device of the potentiometer type comprising a pair of engaging elements one a resistance element of arcuate form and the other a contact element mounted for arcuate movement over said resistance element in rubbing contact therewith about the axis of arcuate form of the resistance element, motor means for driving said contact element, means mechanically applying a torsional vibratory force directly to one of said engaging elements about said axis independently of the motor means and means for varying the intensity of said vibratory force.

No references cited.